United States Patent
Kehl

(10) Patent No.: US 7,752,191 B2
(45) Date of Patent: Jul. 6, 2010

(54) INCREMENTAL-CLICK ANALYSIS OF KEYWORD SEARCHING

(75) Inventor: Thomas A. Kehl, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 482 days.

(21) Appl. No.: 11/567,139

(22) Filed: Dec. 5, 2006

(65) Prior Publication Data

US 2008/0133497 A1 Jun. 5, 2008

(51) Int. Cl.
G06F 7/00 (2006.01)
(52) U.S. Cl. .......................................... 707/707; 705/37
(58) Field of Classification Search ........................ None
See application file for complete search history.

(56) References Cited

U.S. PATENT DOCUMENTS

| | | | | |
|---|---|---|---|---|
| 2004/0167845 | A1* | 8/2004 | Corn et al. | 705/37 |
| 2005/0004835 | A1* | 1/2005 | Roslansky et al. | 705/14 |
| 2005/0080772 | A1* | 4/2005 | Bem | 707/3 |
| 2006/0212350 | A1* | 9/2006 | Ellis et al. | 705/14 |

* cited by examiner

*Primary Examiner*—Charles Rones
*Assistant Examiner*—Dinku W Gebresenbet
(74) *Attorney, Agent, or Firm*—Weaver Austin Villeneuve & Sampson LLP

(57) ABSTRACT

Disclosed are apparatus and methods for quantifying the value of purchasing a particular search keyword, so that a particular search result is presented in a sponsored search results list for that particular search term, as compared to not purchasing the particular search keyword. In example embodiments, the quantified value of the particular search term indicates the particular search term's incremental value when the particular search result is presented in the sponsored search result list, as compared to when the same particular search result is not presented in such sponsored search result list. The particular search term's incremental value is based on a difference between the sum of the number of searchers who select the particular search result from the sponsored search list and the algorithmic search list, if any, versus the number of searchers who select the particular search result when it is not presented in the sponsored search list and may be only presented in the algorithmic search results.

15 Claims, 6 Drawing Sheets

| User ID | Date | Term | Search Results | Sponsor | Owner | Selected |
|---|---|---|---|---|---|---|
| ID_1 | Jan. 2, 2006, 3:03pm | loan | x | yes | Owner_1 | yes |
| ID_1 | Jan. 2, 2006, 3:03pm | loan | y | no | Owner_2 | no |
| ID_1 | Jan. 2, 2006, 3:03pm | loan | z | no | Owner_3 | no |
| ID_2 | Jan. 2, 2006, 3:15pm | Company_abc | 1 | yes | Owner_1 | no |
| ID_2 | Jan. 2, 2006, 3:15pm | Company_abc | 2 | no | Owner_4 | yes |
| ID_2 | Jan. 2, 2006, 3:15pm | Company_abc | 3 | no | Owner_5 | no |
| ID_3 | Jan. 2, 2006, 3:35pm | loan | x | yes | Owner_6 | yes |
| ID_3 | Jan. 2, 2006, 3:35pm | loan | y | no | Owner_1 | no |
| ID_3 | Jan. 2, 2006, 3:35pm | loan | z | no | Owner_2 | no |
| ID_1 | Jan. 2, 2006, 4:00pm | Company_X | A | no | Owner_3 | no |

*Figure 2*

| Search Term | Search Result | Bucket | Bucket Time Period | Click % |
|---|---|---|---|---|
| loan | x | Bidding On | Jan. 2006 | 59% |
| loan | x | Bidding Off | Feb. 2006 | 52% |

*Figure 3A*

| Search Term | Search Result | Bucket | Bucket Time Period | Click % |
|---|---|---|---|---|
| loan | x_1 | Bidding On | Jan. 2006 | 51% |
| loan | x_2 | Bidding On | Jan. 2006 | 8% |
| loan | x_1 | Bidding Off | Feb. 2006 | 31% |
| loan | x_2 | Bidding Off | Feb. 2006 | 21% |

*Figure 3B*

INCREMENTAL-CLICK ANALYSIS OF KEYWORD SEARCHING

BACKGROUND OF THE INVENTION

The present invention is related to techniques for analyzing keyword searches. It also relates to compiling data related to keyword searches for use by purchasers of keywords to assess the value of such purchase.

The field of targeting advertising to Internet users is increasingly the subject of interest to advertisement providers or sellers of advertisement space on the Internet. Typically, if the value of a particular advertisement can be clearly expressed to the advertisement purchasers, the more an advertising provider can charge for such advertisement space.

In order to facilitate advertisement valuation, a wide variety of Internet users and their Internet interactions can be presented in various ways. One area of Internet use that may be presented to a potential advertisement purchaser is the keyword searches that are performed by users, e.g., through Yahoo! or Google. Specific keywords may be determined to be valuable to certain service/product providers or advertisers, and these advertisers may then purchase specific keywords so that the advertiser's website or advertisement is posted along with the search results that are produced from using such purchased search keywords. When an advertiser purchases a specific keyword, a link for the advertiser may be posted in a group of sponsored search results that are presented at the top of the search results or in another highlighted area for presenting search results.

The sponsored search results may be followed by (or adjacent to) search results that are produced by a search algorithm, which operates to present a list of ranked search result links based on the keyword. The search algorithm finds and presents these algorithmic results without anyone having to purchase such algorithmic results. Since the algorithmic search results are presented "for free," an advertiser may not wish to purchase a particular keyword so as to have their link listed in the sponsored search results if the advertiser's link would show up in the algorithmic results. Conversely, an advertiser may wish to purchase certain keywords so as to gain a significantly greater amount of link exposure, as compared to relying on their link being presented and then selected in the algorithmic search results. For example, a purchased link that is presented in the sponsor list may result in substantially more selections of the advertiser's link, than if the link is presented in a relatively low position in the algorithmic search results.

In sum, it would be beneficial to provide a quantitative assessment of a purchased keyword's incremental value when it generates a sponsored search result versus when it is simply presented in the algorithmic search results. Such information on a keyword may serve to enhance such keyword's value and increase its purchase price. Accordingly, sellers of keywords are continually striving to improve the quality of information that can be presented to give enhanced insight to advertisers.

SUMMARY OF THE INVENTION

Accordingly, apparatus and methods for quantifying the value of purchasing a particular search keyword, so that a particular search result is presented in a sponsored search results list for that particular search term, as compared to not purchasing the particular search keyword, are disclosed. In example embodiments, the quantified value of the particular search term indicates the particular search term's incremental value when the particular search result is presented in the sponsored search result list, as compared to when the same particular search result is not presented in such sponsored search result list. The particular search term's incremental value is based on a difference between the sum of the number of searchers who select the particular search result from the sponsored search list and the algorithmic search list, if any, versus the number of searchers who select the particular search result when it is not presented in the sponsored search list and may be only presented in the algorithmic search results.

In one embodiment, a method of quantifying a value of a search term (e.g., keyword or phrase) is disclosed. A selection of a particular search term, that is purchasable by an entity so that one or more selected search results of such entity are presented in a sponsored search results list for the particular search term, is received. For a first time period, a purchasing option is turned on for the selected search results so that the selected search results are presented in the sponsored search results list for the particular search term if a condition is met. For a second time period, the purchasing option is turned off for the selected search term so that the selected search results are not presented in the sponsored search results list for the particular search term. An incremental value is specified that is based on a difference between (i) a first quantified value for the number of times that the selected search results are selected, by a user from the sponsored search results list and from an algorithmic search results list, in the first time period, and (ii) a second quantified value for the number of times that the selected search results are selected, by a user from the algorithmic search results list, in the second time period.

In one aspect, the condition for the particular search results to be presented in the sponsored search results list is met if the entity's bid for the particular search term is accepted (e.g., purchased). In another aspect, the condition is met if the entity purchases the particular search term, with or without bidding. In a specific implementation, when the purchasing option is turned off for the second time period, at least one of the search results is presented in an algorithmic search results list that is generated by the algorithmic based search procedure for the particular search term. In another embodiment, each of the first and second quantified values is a percentage value of the total number of selected search results. In another embodiment, an incremental value is specified for each selected search results based on a difference between (i) a first quantified value for the number of times that each selected search result is selected by a user, from the sponsored search results list and from the algorithmic search results, in the first time period, and (ii) a second quantified value for the number of times that each selected search result is selected by a user, from the algorithmic search results list, in the second time period.

In an alternative embodiment, a selection of a particular search term, that is purchasable by an entity so that one or more selected search results of such entity are presented in a sponsored search results list for the particular search term, is received. For a first time period, a first purchasing option is selected for the selected search results so that the selected search results are presented in a first position in the sponsored search results list for the particular search term. For a second time period, a second purchasing option is selected for the selected search results so that the selected search results are presented in a second position in the sponsored search results list for the particular search term. An incremental value is specified based on a difference between (i) a first quantified value for the number of times that the selected search results are selected by a user, from the first position the purchased search results list, in the first time period, and (ii) a second quantified value for the number of times that the selected search results are selected by a user, from the second position of the sponsored search results list, in the second time period.

In another embodiment, the invention pertains to an apparatus having at least a processor and a memory. The processor and/or memory are configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of the invention and the accompanying figures which illustrate by way of example the principles of the invention.

BRIEF DESCRIPTION OF THE DRAWINGS

FIG. 2 illustrates an example user search database in accordance with one implementation of the present invention.

FIG. 3A illustrates an incremental click database in accordance with a first embodiment of the present invention.

FIG. 3B illustrates an incremental click database in accordance with a second embodiment of the present invention.

DETAILED DESCRIPTION OF THE SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
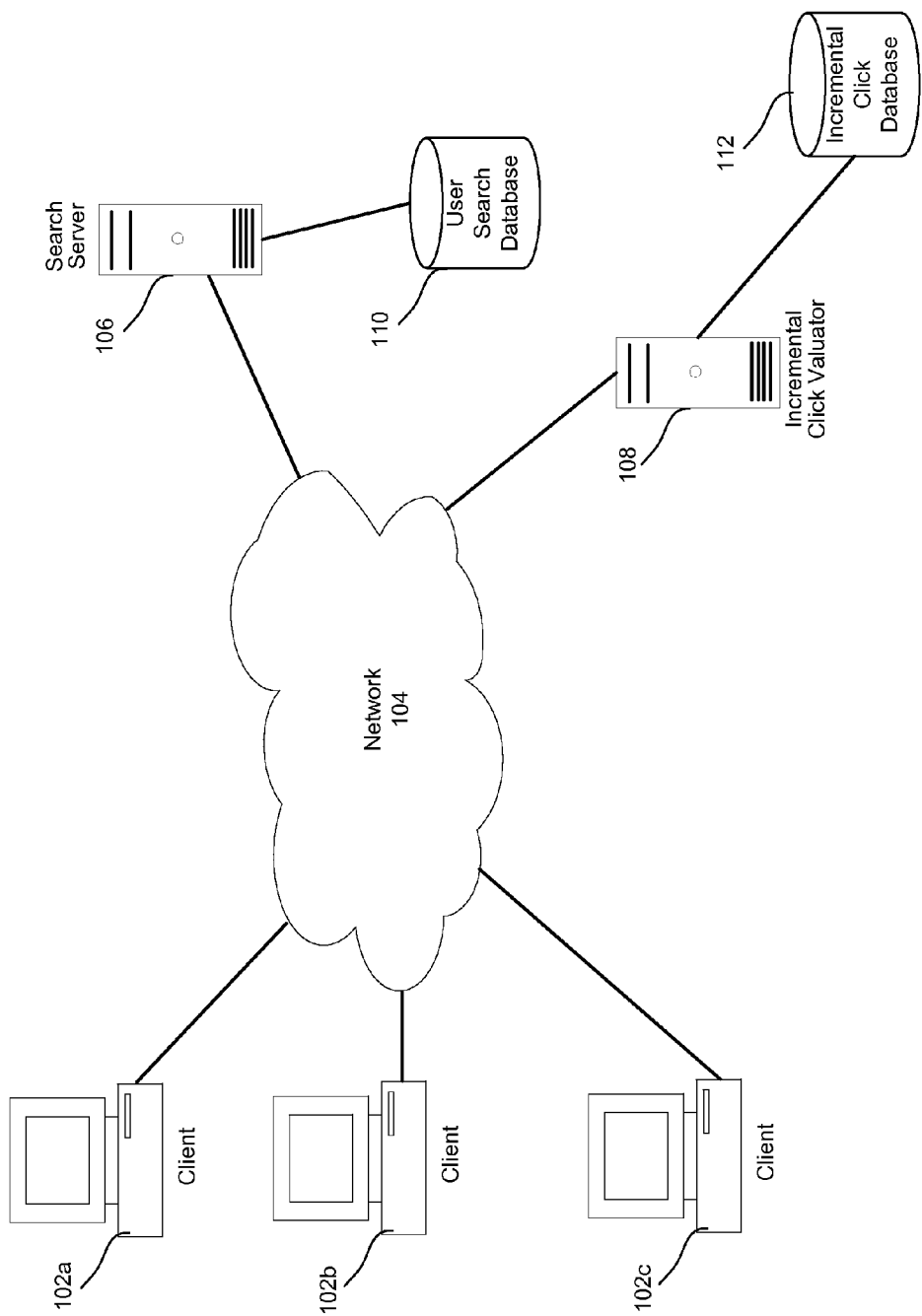
FIG. 1 illustrates an example network segment in which the present invention may be implemented in accordance with one embodiment of the present invention.

FIG. 1 illustrates an example network segment in which the present invention may be implemented in accordance with one embodiment of the present invention. As shown, a plurality of clients 102 may access a search application, for example, on search server 106 via network 104. The network may take any suitable form, such as a wide area network or Internet and/or one or more local area networks (LAN's). The network 104 may include any suitable number and type of devices, e.g., routers and switches, for forwarding search requests from each client to the search application and search results back to the requesting clients.

The invention may also be practiced in a wide variety of network environments (represented by network 104) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The search application generally allows a user (human or automated entity) to search for information accessible via network 104 related to one or more search terms. The search terms may be entered by a user in any manner. For example, the search application may present a web page having any input feature to the client (e.g., on the client's device) so the client can enter one or more search term(s). In a specific implementation, the search application presents an input box into which a user may type any number of search terms. Embodiments of the present invention may be employed with respect to any search application, and example search applications include Yahoo! Search, Google, Altavista, Ask Jeeves, etc. The search application may be implemented on any number of servers although only a single search server 106 is illustrated for clarity.

The search server 106 (or servers) may have access to one or more user search database(s) 110 into which search information is retained. Each time a user performs a search on one or more search terms, information regarding such search may be retained in the user search database(s) 110. For instance, the user's search request may contain any number of parameters, such as user or browser identity and the search terms, that may be retained in the user search database(s) 110. Additional information related to the search, such as the current time, may also be retained along with the search request parameters. When results are presented to the user based on the entered search terms, parameters from such search results may also be retained. For example, the specific search results, such as the web sites, the order in which the search results are presented, whether each search result is a sponsored or algorithmic search result, the owner of each search result, and whether each search result is selected by the user (if any) may also be retained in the user search database(s) 110.

The user search database(s) may take any suitable form for retaining useful search information for incremental click analysis, which is described below. FIG. 2 illustrates an example user search database 200 in accordance with one implementation of the present invention. As shown, the user search database 200 includes a plurality of entries 202a~202c for a first search by a first user ID_1, entries 204a~204c for a second search by a second user ID_2, entries 206a~206c for a third search by a third user ID_3; and entry 208 for a fourth search by the same user ID_1. Of course, each search would more typically include a higher number of entries than shown in FIG. 2. An abbreviated list of search results is illustrated for each search in FIG. 2 for simplification purposes.

Each entry relates various parameters of a particular user's search for a particular search term and a particular search result. In the illustrated example, each entry includes a user identifier (ID), date, search term, search result (that is either viewed or selected), whether such search result is a sponsored search result (e.g., that is purchased for the particular search term), an owner of the search result, and whether such search result was selected by the user. Alternatively, each entry may include a user ID and a plurality of searches that each includes a date, one or more search term(s) and their corresponding search results and related information. The retained information may include other types of data, such as the rank of the selected result among all of the search results, a category for the search term, etc.

The user ID may correspond to any characteristic associated with the searcher, and the search may be a person or an automated entity. This ID may be associated directly with some form of a user's identity, associated with the browser through which the user is requesting a search, or a search client that is running on the user's device. By way of example, the user ID may be obtained from a browser or user cookie. Alternatively, the user ID may take the form of an identity associated with the device which the user is using for their search. Examples of a device identity include IP (internet protocol) addresses or MAC (media access control) addresses.

The date field may correspond to any suitable time format, and may specify any combination of day, month, year, time, and time zone. The search term corresponds to a search term that was used in a specific search. A specific search may include more than one search term, which may be included in the same or a different entry of the user search database. A sponsored field may be included in the entry to specify whether the search result has been sponsored (e.g. a bid accepted) so as to appear in a purchased or sponsored search results list. An owner field may specify an owner of the search result. A search result may include one or more URL (universal remote locator) sites that belong to a same owner. An owner is generally an entity that controls or manages the corresponding search result. For instance, the owner can be a company and the search result can specify the company's main website.

In the present example, a separate entry may be formed for each search term and search result pair. For example, entries 202a~202c each include a user ID equal to "ID_1" and a date "Jan. 2, 2006, 3:03 pm" for a first search. Entries 202a~202c correspond to a search for the search term "loan", which produces sponsored search result x and non-sponsor search results y and z in entries 202b and 202c.

A "no" in the Selected field of entries 202b and 202c indicate that the non-sponsor search results were not selected by the user, while a "yes" in the Selected field of entry 202a indicates that the sponsor search result was selected by the user. User ID_3 also selects the sponsor search result in entry 206a in another search. In contrast, the user ID_2 has selected a non-sponsor search result "2" for search term "Company_abc" of entry 204b, rather than the sponsor search result "1" of entry 202a.

In certain embodiments of the present invention, an incremental click valuator 108 (FIG. 1) operates to specify the incremental value of purchasing (or bidding on) a search term for selected search results, as compared to not purchasing (or bidding on) such search term. The incremental click valuator can have access to the user search database(s) 110, as well as one or more incremental click database(s) 112. Alternatively, the incremental click valuator 108 may be integrated with the search server 106 and/or the incremental click database(s) 112 may be merged with user search database(s) 110.

The incremental click database(s) generally includes any data for determining an incremental value of a selected search term that is purchasable by an owner so that one or more corresponding search results of the owner can be presented in a sponsored search results list. In one embodiment, an owner can bid on a search term during an auction of such search term. If the owner's bid is accepted during the auction the owner's search result can be presented in the sponsored search results list. A particular search term can be said to have a bidding option that can be turned on and off so that bidding can occur or not.

FIG. 3A illustrates an incremental click database 300 in accordance with a first embodiment of the present invention. As shown, the incremental click database 300 includes a plurality of entries (e.g., 302a and 302b) that each have a search term field, a search result field, a bucket identity field for specifying whether the bidding is on or off, a bucket time period, and a click percentage field for specifying the percentage that the particular search result has been selected for the particular bucket time period.

Information regarding two different buckets may be obtained for a particular search term and search result pair. The first bucket of information corresponds to search information that is obtained while a bidding option is on, while a second bucket of information is obtained while the bidding option is off. When the bidding option is on for a particular search result and search term pair, the search result can be presented in a sponsored list of search results when such search term is searched and a bid, from an owner of the search result, is accepted for such search term. The search result may also be presented in a non-sponsor or algorithmic search result list. When the bidding is turned off, the search result may or may not be presented in an algorithmic search list.

The click percentage specifies a percentage that the search result is selected from a total of search result selections. For instance, if there are 1,000 search result selections and a particular search result was selected 500 times for a first time period, the click percentage for the particular search result is 50%. In the present example of FIG. 3A, the search result "x" has a 59% click rate when bidding is on, as compared to a 52% click percentage when bidding is off.

FIG. 3B illustrates an incremental click database 350 in accordance with a second embodiment of the present invention. In this example, a particular advertiser, purchaser, or bidder of a particular search term wishes to have more than one search result analyzed for a same search term. Search results x_1 and x_2 may both originate from (or be owned by) an entity or subsidiary of the bidding entity or be in some way related. In a specific example, x_1 may represent a distributor of a particular product and x_2 may represent a distributor of accessories for the same product. In another example, x_1 and x_2 may represent different distributors of the same product. The owner may wish to assess the relative click percentage of the different search results, for example, if the owner would like a different exposure for the different search results.

In the example of FIG. 3B, entries 352a~352d all correspond to search term "loan." Entries 352a and 352b correspond to search results x_1 and x_2, respectively, and their respective click percentages while bidding is on. In contrast, entries 352c and 352d correspond to search results x_1 and x_2, respectively, and their respective click percentages while bidding is off. Although the click percentages for multiple search results are specified individually, the click percentages for multiple search results may also be added together and specified as a single percentage. The click percentages of all the search results that are owned by a same owner may also be summed together. In the present example, the search result "x" of FIG. 3A may correspond to both search results x_1 and x_2. Thus, the click percentage of the bidding "on" bucket is 59% for search result "x" which is the sum of click percentages 51% and 8% for search results x_1 and x_2 during the bidding "on" time period. Likewise, the click percentage of the bidding "off" bucket is 52% for search result "x" which is the sum of click percentages 31% and 21% for search results x_1 and x_2 during the bidding "off" time period.

Figure 4:
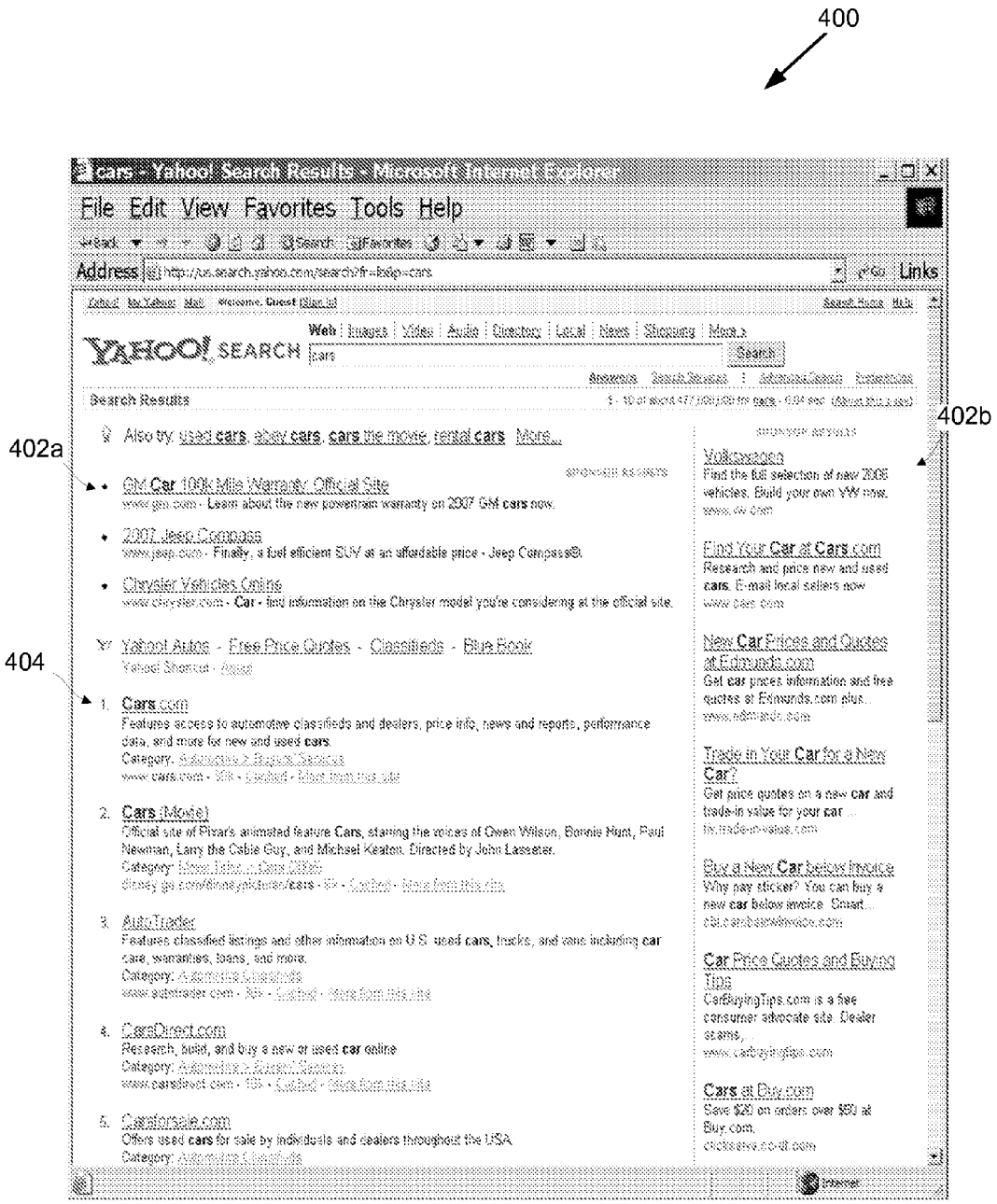
FIG. 4 is a screen shot of an example search results page for searching on the "cars" search term.

FIG. 4 is a screen shot 400 of an example search results page for searching on the "cars" search term. The search results include two sponsored search lists 402a and 402b and an algorithmic search list 404. In this example, the search result for the "GM" web site is listed in position (1) in the sponsored list 402a and not in the algorithmic search list 404. The absence of the GM search result in, at least the top portion, the algorithmic search list 404 may adversely affect the click percentage of the GM search result if bidding is turned "off" for such GM search result. That is, the number of times that the GM result is selected may be significantly reduced. Conversely, the incremental click value of the GM web site may be significant, e.g., the selection rate for the bidding "on" time period versus the selection rate for the bidding "off" time period. Embodiments of the present invention specify a quantification of this incremental click selection value.

Figure 5:
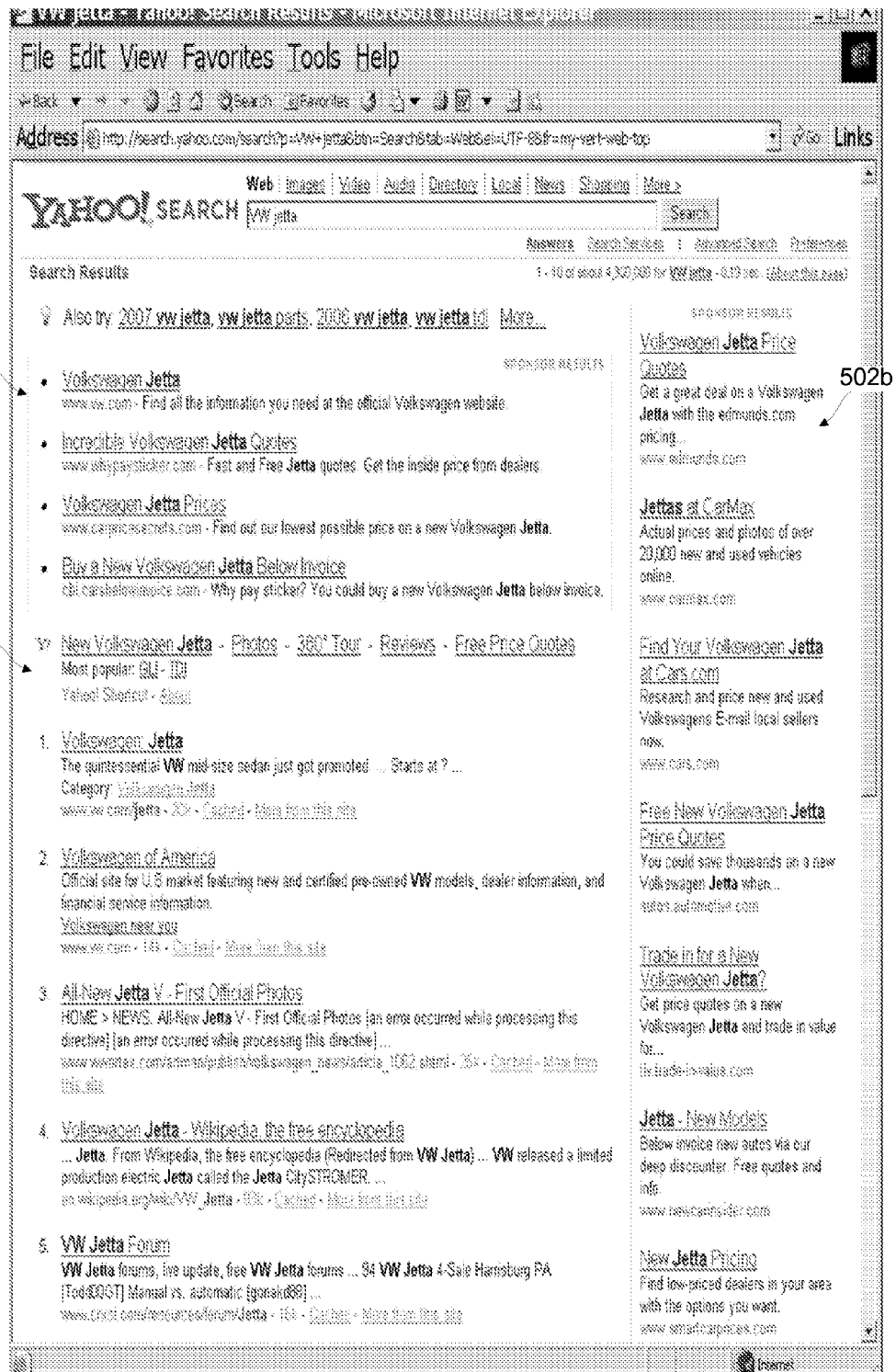
FIG. 5 is a screen shot of an example search results page for searching on the "VW Jetta" search term.

FIG. 5 is a screen shot 500 of an example search results page for searching on the "VW Jetta" search term. The search results for searching on the term "VW Jetta" are presented in sponsored areas 502a and 502b and algorithmic search area 504. As shown, there are several entities that may be related to the VW company. For instance, in the algorithmic area 504, there is a search result for the VW parent company in the first ranked position (1) and a search result for a VW Jetta Forum, which is not owned by the parent VW company, in the $5^{th}$ ranked position (5). The parent VW company may wish for certain entities to have more exposure than other entities and thereby wish to obtain incremental click values for a plurality of search results, e.g., to know whether the parent search result is selected more often than the VW Jetta Forum search result. For example, the VW company may wish its parent web site to have more exposure than a car dealer's site that is not affiliated with the VW company, and wish to assess what happens to the selection rate of these related sites when the parent site bidding is turned off and on.

Once user search information has been retained for a search term with the bidding option turned on for one or more search results and with such bidding option then turned off (or during retaining of this information), this retained search information can be analyzed for the incremental value of purchasing such search term. For example, when bidding is on, the owner of a search result may bid high enough to have their search result presented in the sponsored list. However, when bidding is off, such search result is no longer presented in the sponsored list, even when the owner has a highest bid.

Figure 6:
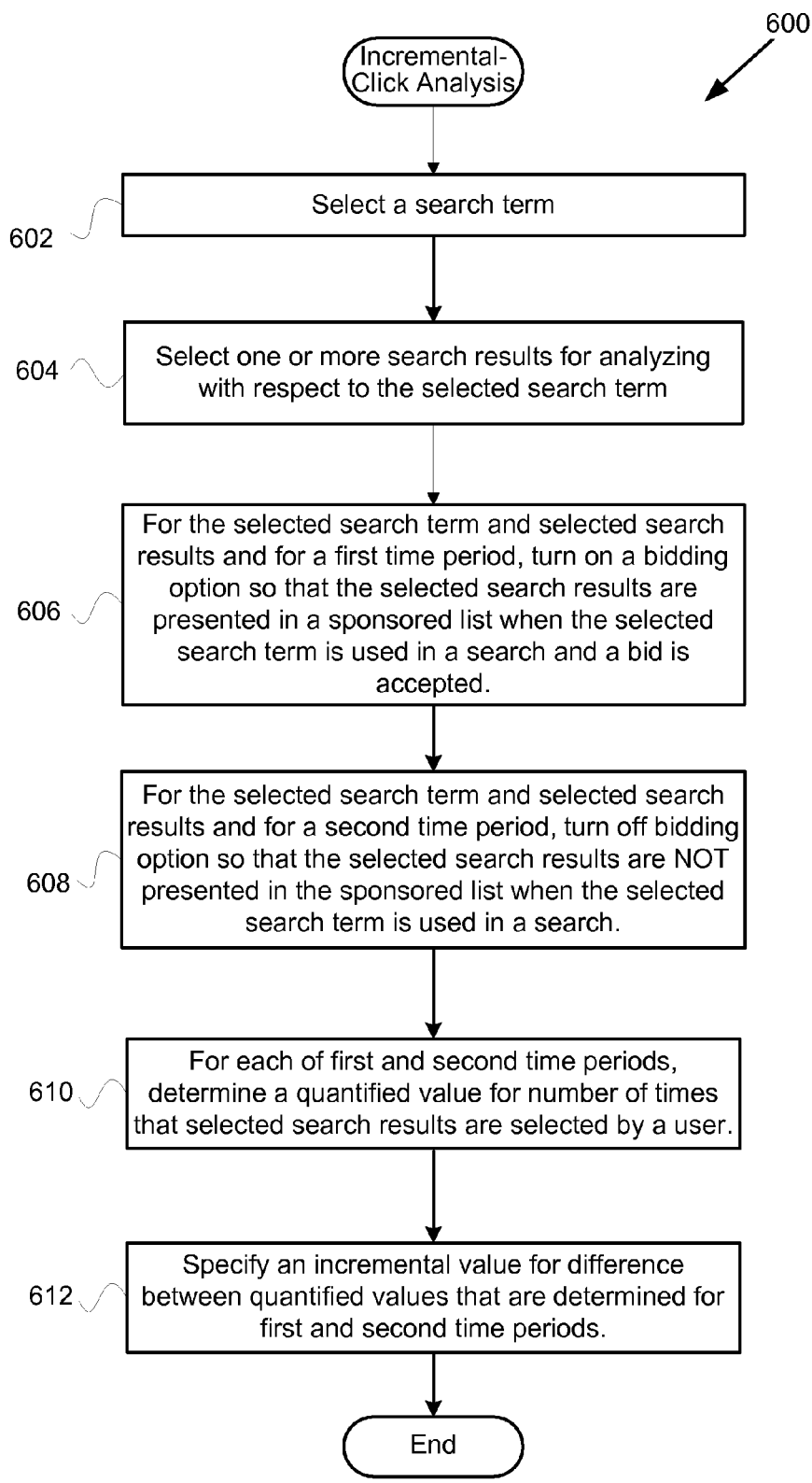
FIG. 6 is a flow chart illustrating a procedure for an incremental click analysis in accordance with one embodiment of the present invention.

FIG. 6 is a flow chart illustrating a procedure for an incremental click analysis in accordance with one embodiment of the present invention. Initially, a search term may be selected for analysis in operation 602. One or more search results are also selected for analyzing with respect to the selected search term in operation 604.

By way of example, a user of the Incremental Click Valuator 108 may select a search term and one or more selected search results of interest. The selected search term and associated search results may be fed into the incremental click analysis process in any suitable manner, such as an input field in a user interface for the incremental click analysis process. The selected term and associated search results are preferably handled by an administrator or owner of such incremental click analysis application.

For the selected search term and selected search results and for a first time period, a bidding option is turned on so that the selected search results are presented in a sponsored list when the selected search term is used in a search and a bid by an owner of the selected search results is accepted in operation 606. For the bidding option turned on, a selected search results may also be presented in an algorithmic search results list, as well as the sponsor list. For the selected search term and selected search results and for a second time period, the bidding option is turned off so that the selected search results are not presented in a sponsored list when the selected search term is used in a search in operation 608.

For each of the first and second time periods, a quantified value is determined for the number of times that the selected search are selected by a user in operation 610. Each quantified value may correspond to a selection percentage of the total number of selections for the particular time period for which the selected search results are selected. For the first time period, the number of times that the search results are selected from both the sponsored list (if the owner's bid is accepted and the search term is purchased) and the algorithmic list (if the selected search results appear in this list) is determined. For the second time period, the number of times that the selected search results are selected from the algorithmic search results (if the owner's link appears in this list) is determined. When there are multiple search results to analyze for a same owner, a quantified value may be determined for each search result or a single quantified value may be determined for the multiple search results.

In an alternative non-auction embodiment, a purchasing option can be turned on and off. In this example, an owner of a search result has purchased a search term in a simple sale arrangement without bidding. When the purchasing option is turned on, this owner's search result is presented in the sponsored list. When the purchasing option is turned off, this owner's search result is left out of the sponsored list. The click rates for the owner's search result are determined for the two periods of time when the purchasing option is on and off, respectively.

The quantified values may be determined by analysis of the user search database(s) for each respective time period. Alternatively, each quantified value may be periodically updated as each search occurs in each respective time period. In this latter example, the incremental click valuator engine receives search information each time a search is performed or periodically during the designated time period, and in the former example the incremental click valuator can access the user search database after each of the respective time periods end.

An incremental value is then specified for the difference between the quantified values that are determined for the first and second time periods in operation 612. This incremental click analysis may be performed for any number of search terms and search results. In the example of FIG. 3A, the incremental value for the search result x is 7% (59−52). In the example of FIG. 3B, the incremental value for search results x_1 and x_2 is also 7% ((51±8)−(31+21)). In alternative embodiments, the incremental click value may be a difference between the absolute selection numbers during the two different time periods. For example, if the search result "x" was selected 1000 times during the bidding "on" time period and 950 times during the biding "off" time period, the incremental click value is 50.

Alternatively, if the purchaser wishes to know the incremental values of individual search results, the incremental value for search result x_1 is 20% (51−31) and the incremental value for search result x_2 is −13 (8−21). When a negative value is specified for an incremental click value, this denotes that the search result is selected more when bidding is turned off. However, bidding may only be in force for one of the selected search results, e.g., x_1 and not x_2. Thus, when the bidding is turned off, it is actually only turned off for x_1, while the bidding for x_2 remains off for both time periods. When the bidding is turned off for x_1, the selection rate of the non-bid search term x_2 increases.

In other embodiments, a search result's relative position in a sponsor list may be analyzed. That is, a search result's position may be changed from a first position to a second position in the sponsor list, rather than turning a bidding or purchasing option on and off. For example, a click percentage is determined for a first time period in which the search result is in position (1) in the sponsor list (bidding on) and a second click percentage is determined for a second time period in which the search result is in position (4) in the sponsor list (e.g., bidding is still on). An incremental value may then be determined based on the difference between the click percentages of position (1) and position (4).

Example embodiments of the present invention have several associated advantages. For example, embodiments of the present invention provide a new measure of an advertisement's value and reach in the search industry. For instance, a search result owner can determine a specific, quantified value for bidding on and purchasing of a search term, as compared to not purchasing such search term, for a particular search result. An owner can also assess the value of different bid packages, e.g., different sponsor positions or different sets of search results in different sponsor positions, etc. The owner can also assess the affect that other related search results have on their particular search result of interest by obtaining incremental click results for individual related search results, for example, when bidding is turned on and off for the search result of interest. Additionally, embodiments of the present invention provide a automated and easily scaleable mechanism for obtaining incremental click values. Without such an automated process, a researcher would have to manually, on an ad hoc basis, determine an incremental value by analyzing the user search results, and this manual process would not be easily scalable.

Figure 7:
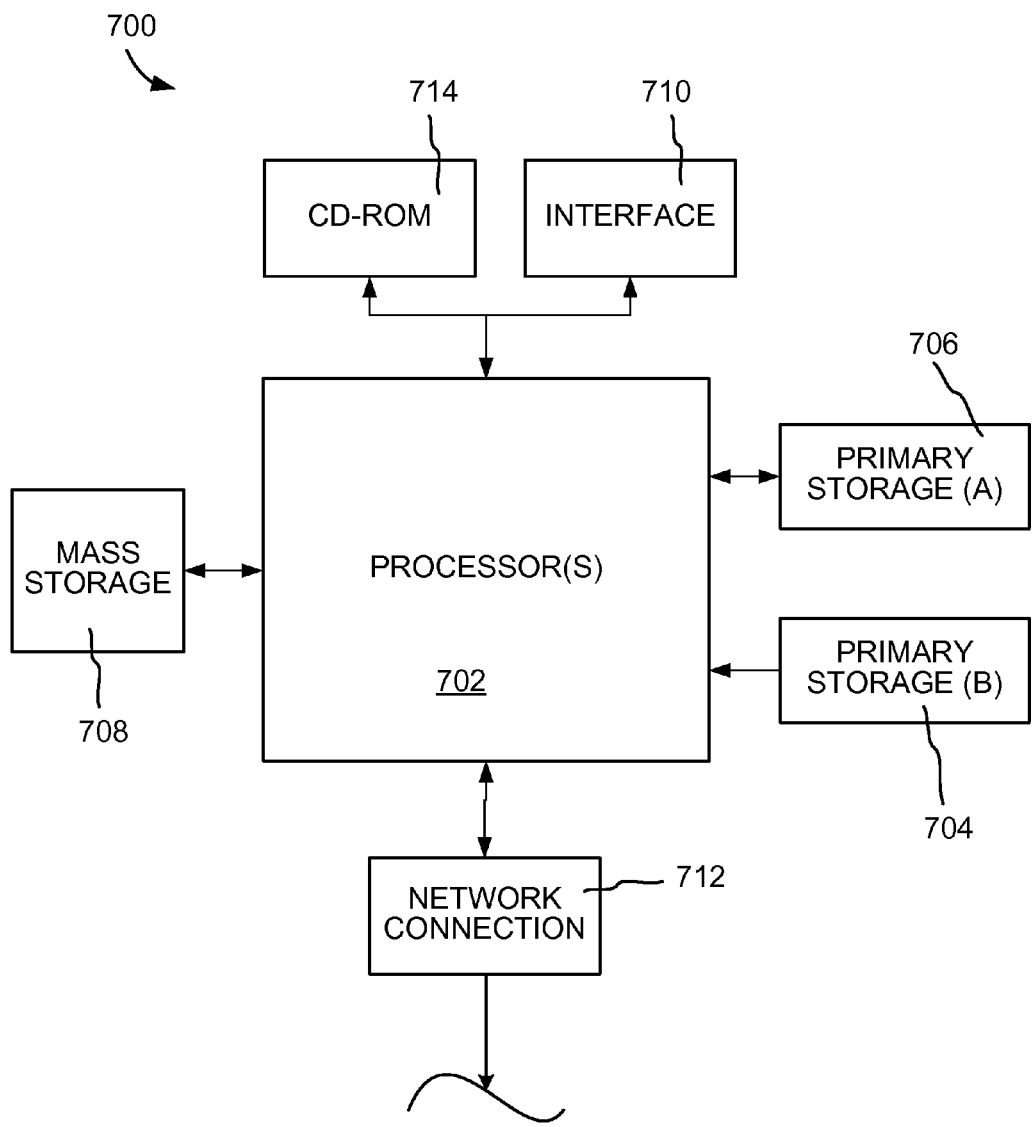
FIG. 7 illustrates an example computer system in which specific embodiments of the present invention may be implemented.

The present invention may be implemented in any suitable combination of hardware and/or software. FIG. 7 illustrates a typical computer system that, when appropriately configured or designed, can serve as an incremental click valuator of this invention. The computer system 700 includes any number of processors 702 (also referred to as central processing units, or CPUs) that are coupled to storage devices including primary storage 706 (typically a random access memory, or RAM), primary storage 704 (typically a read only memory, or ROM). CPU 702 may be of various types including microcontrollers and microprocessors such as programmable devices (e.g., CPLDs and FPGAs) and unprogrammable devices such as gate array ASICs or general purpose microprocessors. As is well known in the art, primary storage 704 acts to transfer data and instructions uni-directionally to the CPU and primary storage 706 is used typically to transfer data and instructions in a bi-directional manner. Both of these primary storage devices may include any suitable computer-readable media such as those described above. A mass storage device 708 is also coupled bi-directionally to CPU 702 and provides additional data storage capacity and may include any of the computer-readable media described above. Mass storage device 708 may be used to store programs, data and the like and is typically a secondary storage medium such as a hard disk. It will be appreciated that the information retained within the mass storage device 708, may, in appropriate cases, be incorporated in standard fashion as part of primary storage 706 as virtual memory. A specific mass storage device such as a CD-ROM 714 may also pass data uni-directionally to the CPU.

CPU 702 is also coupled to an interface 710 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to an external device such as a database or a computer or telecommunications network using an external connection as shown generally at 712. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store user search database(s), incremental click database(s), etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as air, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A computer implemented method of quantifying a value of a search term, comprising:

receiving at a server a selection of a particular search term and a selection of a plurality of particular search results for analyzing each search result with respect to the particular search term;

in response to the selection of the particular search term and the selection of the particular search results and after such selections are received, determining an incremental value for each particular search result based a comparison of quantifiable results from purchasing the particular search term versus not purchasing such particular search term by:

for a first time period, turning on a purchasing option for the particular search term so that the particular search term is purchased and the particular search result is presented in a sponsored search results list for searches performed by a plurality of users for the particular search term;

for a second time period that differs from the first time period, turning off the purchasing option for the particular search term so that the particular search result is not presented in the sponsored search results list for searches performed by a plurality of users for the particular search term; and determining and storing in one or more databases the incremental value for the particular search result based on a difference between (i) a first quantified value corresponding to the number of times that the particular search result is selected, by a user from the sponsored search results list or from an algorithmic search results list, in the first time period, and (ii) a second quantified value corresponding to the number of times that the particular search result is selected, by a user from the algorithmic search results list, in the second time period.

2. The computer implemented method as recited in claim 1, wherein when the purchasing option is turned off for the second time period, the particular search result is presented in the algorithmic search results list that is generated by an algorithmic based search procedure for the particular search term.

3. The computer implemented method as recited in claim 1, wherein each of the first and second quantified values is a percentage value of the total number of total search results that are selected from the searches of the particular search term.

4. The computer implemented method as recited in claim 1, wherein, for each of one or more of the search results, the particular search term is purchased by an entity when the entity's bid for the particular search term is accepted during the first time period.

5. The computer implemented method as recited in claim 1, wherein, for each of one or more of the search results, the particular search term is purchased by an entity during the first time period.

6. An apparatus comprising at least a processor and a memory, wherein the processor and/or memory are configured to perform the following operations:

receiving a selection of a particular search term and a selection of a plurality of particular search results for analyzing each search result with respect to the particular search term;

in response to the selection of the particular search term and the selection of the particular search results and after such selections are received, determining an incremental value for each particular search result based on a comparison of quantifiable results from purchasing the particular search term versus not purchasing such particular search term by:

for a first time period, turning on a purchasing option for the particular search term so that the particular search term is purchased and the particular search result is presented in a sponsored search results list for searches performed by a plurality of users for the particular search term;

for a second time period that differs from the first time period, turning off the purchasing option for the particular search term so that the particular search result is not presented in the sponsored search results list for searches performed by a plurality of users for the particular search term; and determining and storing in one or more databases the incremental value for the particular search result based on a difference between (i) a first quantified value corresponding to the number of times that the particular search result is selected, by a user from the sponsored search results list or from an algorithmic search results list, in the first time period, and (ii) a second quantified value corresponding to the number of times that the particular search result is selected, by a user from the algorithmic search results list, in the second time period.

7. The apparatus as recited in claim 6, wherein when the purchasing option is turned off for the second time period, the particular search result is presented in the algorithmic search results list that is generated by an algorithmic based search procedure for the particular search term.

8. The apparatus as recited in claim 6, wherein each of the first and second quantified values is a percentage value of the total number of total search results that are selected from the searches of the particular search term.

9. The apparatus as recited in claim 6, wherein the particular search term is purchased by an entity when the entity's bid for the particular search term is accepted.

10. The apparatus as recited in claim 6, wherein, for one or more of the search results, the particular search term is purchased by an entity during the first time period.

11. A computer readable storage medium having computer program instructions stored thereon that are arranged to perform the following operations:

receiving a selection of a particular search term and a selection of a plurality of particular search results for analyzing with respect to the particular search term;

in response to the selection of the particular search term and the selection of the particular search results and after such selections are received, determining an incremental value for each particular search result based on a comparison of quantifiable results from purchasing the particular search term versus not purchasing such particular search term by:

for a first time period, turning on a purchasing option for the particular search term so that the particular search term is purchased and the particular search result is presented in a sponsored search results list for searches performed by a plurality of users for the particular search term;

for a second time period that differs from the first time period, turning off the purchasing option for the particular search term so that the particular search result is not presented in the sponsored search results list for searches performed by a plurality of users for the particular search term; and determining the incremental value for the particular search result based on a difference between (i) a first quantified value corresponding to the number of times that the particular search result is selected, by a user from the sponsored search results list or from an algorithmic search results list, in the first time period, and (ii) a second quantified value corresponding to the number of times that the particular search result is selected, by a user from the algorithmic search results list, in the second time period.

12. The computer readable storage medium as recited in claim 11, wherein when the purchasing option is turned off for the second time period, the particular search result is presented in the algorithmic search results list that is generated by an algorithmic based search procedure for the particular search term.

13. The computer readable storage medium as recited in claim 11, wherein each of the first and second quantified values is a percentage value of the total number of total search results that are selected from the searches of the particular search term.

14. The one computer readable storage medium as recited in claim 11, wherein, for each of one or more of the search results, the particular search term is purchased by an entity when the entity's bid for the particular search term is accepted during the first time period.

15. The computer readable storage medium as recited in claim 11, wherein, for each of one or more of the search results, the particular search term is purchased by an entity during the first time period.

* * * * *